(12) United States Patent
Chase et al.

(10) Patent No.: US 7,840,645 B1
(45) Date of Patent: Nov. 23, 2010

(54) METHODS AND APPARATUS FOR PROVIDING CONTENT OVER A COMPUTER NETWORK

(75) Inventors: Joshua Miles Chase, Santa Barbara, CA (US); James A. Aviani, Santa Barbara, CA (US); Bruce Arthur Lueckenhoff, Santa Barbara, CA (US); Kenneth Earl Mueller, II, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1144 days.

(21) Appl. No.: 10/029,667

(22) Filed: Oct. 22, 2001

(51) Int. Cl.
G06F 15/16 (2006.01)
(52) U.S. Cl. .................... 709/217; 709/219; 709/229
(58) Field of Classification Search ......... 709/217–219, 709/239, 244, 229
See application file for complete search history.

(56) References Cited

U.S. PATENT DOCUMENTS

| | | | |
|---|---|---|---|
| 5,948,061 A * | 9/1999 | Merriman et al. ........... 709/219 |
| 6,081,900 A * | 6/2000 | Subramaniam et al. ....... 726/19 |
| 6,085,229 A * | 7/2000 | Newman et al. ............ 709/203 |
| 6,141,759 A | 10/2000 | Braddy ....................... 713/201 |
| 6,157,917 A | 12/2000 | Barber ........................ 705/26 |
| 6,182,142 B1 | 1/2001 | Win et al. .................... 709/229 |
| 6,195,691 B1 | 2/2001 | Brown ........................ 709/219 |
| 6,249,810 B1 * | 6/2001 | Kiraly ......................... 709/217 |
| 6,304,967 B1 | 10/2001 | Braddy ....................... 713/150 |
| 6,308,202 B1 * | 10/2001 | Cohn et al. .................. 709/217 |
| 6,332,127 B1 * | 12/2001 | Bandera et al. ............... 705/14 |
| 6,397,246 B1 * | 5/2002 | Wolfe ......................... 709/217 |
| 6,438,125 B1 | 8/2002 | Brothers ..................... 370/352 |
| 6,438,578 B1 * | 8/2002 | Schmid et al. .............. 709/203 |
| 6,453,353 B1 | 9/2002 | Win et al. .................... 709/229 |
| 6,460,036 B1 * | 10/2002 | Herz ........................... 709/217 |
| 6,487,538 B1 * | 11/2002 | Gupta et al. ................ 709/219 |
| 6,505,240 B1 * | 1/2003 | Blumenau ................... 709/218 |
| 6,564,243 B1 * | 5/2003 | Yedidia et al. .............. 709/203 |
| 6,581,090 B1 * | 6/2003 | Lindbo et al. ............... 709/217 |
| 6,622,157 B1 | 9/2003 | Heddaya et al. ............. 709/202 |
| 6,687,734 B1 * | 2/2004 | Sellink et al. ............... 709/203 |
| 6,714,975 B1 * | 3/2004 | Aggarwal et al. ........... 709/219 |
| 6,763,379 B1 * | 7/2004 | Shuster ....................... 709/219 |
| 6,816,909 B1 * | 11/2004 | Chang et al. ................ 709/219 |
| 6,892,226 B1 * | 5/2005 | Tso et al. .................... 709/218 |
| 6,950,804 B2 * | 9/2005 | Strietzel ..................... 709/217 |
| 7,028,072 B1 * | 4/2006 | Kliger et al. ................ 709/203 |
| 2002/0016736 A1 * | 2/2002 | Cannon et al. ............... 705/14 |
| 2002/0077900 A1 * | 6/2002 | Thompson et al. ........... 705/14 |

* cited by examiner

*Primary Examiner*—Dohm Chankong
(74) *Attorney, Agent, or Firm*—Patterson & Sheridan, LLP

(57) ABSTRACT

The invention is directed to methods and techniques in a communications device for delivering content. In particular the technique includes intercepting, from a requesting device, an initial request for initial content accessible from an initial content source and in response to intercepting the initial request, creating redirection information indicating an identity of secondary content to be accessed by the requesting device in addition to the initial content in the initial request and providing the redirection information to the requesting device, such that the requesting device accesses both the secondary content from the secondary content source as well as the initial content from the initial content source.

15 Claims, 8 Drawing Sheets

METHODS AND APPARATUS FOR PROVIDING CONTENT OVER A COMPUTER NETWORK

BACKGROUND OF THE INVENTION

Advancements in computer and networking technologies have resulted in the creation of computer and information networks such as the Internet which interconnect many thousands of computer systems together to allow them to share information. The computers are connected to one another by digital networks made up of telecommunications facilities, digital switches, bridges, hubs, servers, other computers, etc. Users are able to access the information, for example, using a web browser software program running on a desktop or other type of computer.

The typical manner for obtaining such information is for a user to identify a desired page of internet content by specifying a so-called uniform resource locator or URL to a web browser software program. The URL will typically specify a location address of a server holding the desired content, a file name identifying the content to be downloaded to the user computer and a communications protocol (e.g., the hypertext transport protocol or http) that the web browser and server should use for the exchange of the content. When a web server receives such a request, the web server can respond by obtaining and returning, over the computer network, the contents of the document specified in the request to the requesting web browser.

The Internet can provide, to the consuming public, information originating from all over the world. Users can also access so-called search engines to locate sought-after information, display the information from web sites, search through documents, link to other web sites, etc. in order to view information that is pertinent to their interests.

One popular use of the Internet is for advertising goods and services to consumers. Even though the Internet has exploded as a medium for the exchange of information, traditional methods of advertising still hold center stage in the commercial world. Newspaper, radio and television are used by advertisers to provide readers and viewers with continuous enticements and product information. Each method has an advantage over the other with newspaper being able to provide more detailed information, radio having the logistical advantage of capturing listeners attention even though they may be involved in other activities and television being able to provide a more "alive" representation of products and services being advertised.

SUMMARY OF THE INVENTION

Unfortunately there are deficiencies in the available methods for providing advertising and related or targeted content to an Internet audience. In particular, because of the Internet's global perspective, Internet advertising is blind to where the viewers of the information are located. In other words, advertising on the internet is limited in the ways that advertisers can target their audiences. As a result, advertising is inevitably distributed to viewers who spend time viewing advertising that may be inappropriate for them. The advertising may also end up being distributed to viewers, to whom the advertisers would rather not have distributed it, thus generating unwanted consumer responses. These dynamics create a barrier that make certain types of advertising impractical on the Internet, that would otherwise be useful.

There are some methods in existence that provide limited control over delivery of Internet content. The use of so-called cookies, that is, files stored on user computers under software control of an Internet content provider, serve as a means to identify users and some information about them. Cookie-related methods are limited by the nature of the criteria that providers can employ for identification purposes. For example, a provider may use cookies to identify that a user has viewed certain particular Internet content at an earlier time. Browsers using cookies record the cookies in a file on the user computer and provide mechanisms for later detection of the cookies. Content providers can use the cookie files for other identification purposes too. However, the user information provided by cookies is typically, at some point, created as a result of the user entering data or performing some action at an earlier time such as by visiting the content provider's web site. There is no widespread form of data that is otherwise available on user systems, which is available across a wide range of user systems and platforms, that a content provider can use to extract information such as user locations.

Cookies are further limited in the type and the amount of information that can be stored on user computers and are limited in their sophistication due to the burden that they place on user systems' performance. They are also vulnerable to being shut off, deleted, or by-passed by users or by other technical means.

As a result, geographic targeting of advertising or other content or material on the internet is limited using conventional techniques. By way of example, there is no effective way using conventional content delivery techniques to target advertising to users in specifically identified geographic areas.

In contrast to conventional approaches, the invention is directed to techniques and mechanisms for transparently providing a customized presentation of advertising or other content using geographic and other related criteria as the basis for choosing different content for presentation to different diversely located users.

The method described herein, provides a way to intercept a user's or initial request (e.g., a web page request) for Internet or other content (e.g., initial content), then employ one of several techniques for providing secondary content to that user such as advertisements in addition to the initial content originally requested by that user. The initial and secondary content may be obtained from different sources such as different web sites. The method also includes a way to extract other information from the initial request and use it as a basis for customizing the secondary content provided to a user.

According to one method, a communications device intercepts, from a requesting device, an initial request for initial content at the entry point to the Internet or other communications network (e.g., at an end-user's ISP facility). The communications device extracts or reads request criteria such as geographic or other information (e.g., a ZIP code) provided along with the initial request or with which the communications device is programmed, treating the information as a condition or criteria to be used to make a determination about what secondary content should be provided to the requesting device. This allows for the delivery of secondary or alternative content based upon geographic locations. In this way, decisions can be made that result in the provision of secondary content that is appropriate to the user location or other criteria. Other information such as global positioning coordinates, last mile link capacities, source and destination information or hypertext transfer protocol content information may also be used as conditions or request criteria as well.

After making a determination about what secondary content to use (e.g., what advertisements), the communications device re-directs the initial request to a secondary location (e.g., secondary content source or device), for example, by a transmission control protocol code 302 redirection. A code 302 redirection is a command, that the communications device sends back to a client process such as an Internet browser requesting the initial content, that causes the browser to initiate another secondary request to the address of an alternate or secondary content source, provider or device. An address (URL) of the secondary content source is provided to the browser along with the code 302 redirection command.

In addition, the communications device appends redirection information, such that the address of the initial content source of the initial content to the address of the secondary content source (to form the redirection information) so that the secondary content source can later redirect the secondary request to the originally-requested source of content. Alternative embodiments of the invention allow content from the secondary content source to be displayed at the requesting device in different ways, including, providing a reference within the displayed secondary content that can be selected by a user (e.g., a pop-up), displaying content from the secondary content source for a timed interval, or other configuration, etc.

After the secondary content source providing secondary content has provided its secondary content, the secondary content source re-directs the requesting device to the initial content source location of the initial content.

An alternative embodiment is to allow the device that performs the interception to maintain control of the initial request rather than relinquish control to a secondary content source. This may be accomplished by providing the requesting device with a command or commands that display a framework on the requesting device (e.g., client computer system) through which secondary content from the secondary content source and/or initial content requested from the initial content source can be displayed.

In another alternative embodiment of the invention, after intercepting the initial request, the communications device forwards information related to the initial request to an information store accessible by a content source. At the same time, the communications device establishes a key that can be used to locate the information and forwards the key to the content source. The content source can use the information accessed by using the key as a basis for determining what content to provide to the client process, or uses the information to perform other activities. The information store 144 may be a disk drive (e.g., a data base located on a disk drive) or other storage device connected to the content source, or a communications device or initial and/or secondary content source 145, 160 (See FIG. 1) accessible by the content source. In other embodiments, the information can be provided to the information store prior to generation of the initial request. As described, these embodiments can be applied to either initial or secondary content sources.

One embodiment of the invention can provide targeted advertising, but other embodiments are also possible.

One embodiment of the invention is a method, in a communications device, for delivering content. The method includes intercepting, from a requesting device, an initial request for initial content accessible from an initial content source. The method also creates redirection information indicating an identity of secondary content to be accessed by the requesting device in addition to the initial content in the initial request in response to intercepting the initial request, and providing the redirection information to the requesting device, such that the requesting device accesses both the secondary content from the secondary content source as well as the initial content from the initial content source. The embodiment provides a way to provide additional content besides the content originally-requested by a user.

Another embodiment includes the steps of transmitting the secondary content to the requesting device from the secondary content source and transmitting the initial content to the requesting device from the initial content source. It provides a method to provide content from both an initially requested source as well as a secondary content source.

In another embodiment, the secondary content contains a reference to the identity of the initial content, such that when the requesting device receives the secondary content in response to the step of transmitting the secondary content to the requesting device, the requesting device can invoke the reference to the identity of the initial content in order to access the initial content causing performance of the step of transmitting the initial content to the requesting device. This method provides a user option to view information obtained from a secondary content source.

In another embodiment, the steps of transmitting the secondary content to the requesting device and transmitting the initial content to the requesting device occur in relation to each such that the requesting device has concurrent access to the secondary content and the initial content. The concurrent access permits the presentation of content from both sources in a variety of configurations best suited to effective presentation of both contents and good design of the whole user experience. Typical options include presentation of the material interstitially, as pop-up windows, borders, etc. These options help to provide an aesthetically pleasing presentation of initial and secondary content for a user to view.

In another embodiment, the redirection information includes a redirection command operable by the requesting device wherein the redirection command includes the identity of secondary content causing the requesting device to access the secondary content from the secondary content source, in response to the step of providing. This method provides for management of content delivery at the secondary content source, for example, within a server farm.

In another embodiment, the redirection command further includes the identity of the initial content specified by the initial request, such that when the requesting device operates the redirection command, the secondary content source receives the identity of the initial content specified in the redirection command and causes the requesting device to receive both the secondary content and the initial content.

In another embodiment, the redirection information includes a first redirection command operable by the requesting device and the identity of secondary content. In this case, the step of providing includes a first step of providing the first redirection command to the requesting device to allow the requesting device to access the secondary content from the secondary content source and a second redirection command operable by the requesting device and the identity of initial content to provide the second redirection command to the requesting device to allow the requesting device to access the initial content from the initial content source.

In yet another embodiment, the communications device performs a step of providing a delay between the first and second steps of providing so that the requesting device receives the secondary content in response to operating the first redirection command and then receives the initial content in response to operating the second redirection command at a time at least equal to the delay between the first and second steps of providing.

In one embodiment, the redirection information includes a framework operable by the requesting device. The method of providing the redirection information the steps of providing the secondary content to the framework so that the requesting device can access the secondary content and providing the initial content to the framework so that the requesting device can access the initial content subsequent to accessing the secondary content. This method provides a means for performing all activities at, and under the control of the communications device rather than to relinquish control to other devices.

In an additional method the step of creating redirection information includes extracting request criteria from the initial request and selecting the identity of secondary content based from a plurality of identities of secondary content based upon the request criteria. Accordingly the secondary content accessible by the requesting device is dependent upon the request criteria of the initial request. An advantage of this embodiment is that it permits tailoring of secondary content according to the source, destination or a variety of other criteria. Using this method, secondary content can be transparently tailored according to the content which is most appropriate.

In another embodiment, secondary content is advertising. In this embodiment, the step of extracting and selecting are performed to select secondary content for targeted advertising presentation to the requesting device.

Another embodiment includes the further step of detecting an occurrence of a secondary content condition. The secondary content condition indicates a requirement for presentation of secondary content to the requesting device. In response to detecting an occurrence of a secondary content condition, the steps of intercepting, creating redirection information and providing the redirection information to the requesting device are performed, such that the requesting device accesses the secondary content after occurrence of the secondary content condition.

In another embodiment, the secondary content condition is either detection of a change in root level domains between the initial request and former requests or an elapsed period of time.

In yet another embodiment the communications device intercepts, from a requesting device, an initial request for content from a content source, identifies information related to the initial request, generates a key based on the information related to the initial request and sends the key to the content source to allow the content source to access the information related to the initial request.

In another embodiment the communications device forwards the initial request to the content source.

In another embodiment the key generated by the communications device associates information including at least one of demographic and geographic information to the initial request.

In yet another embodiment content source receives an initial request for initial content, receives a key, from a communications device, for locating information related to the initial request, selects content based on the information and transfers the content onto a network for receipt by the requesting device.

In another embodiment the content source provides the initial content to the requesting device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
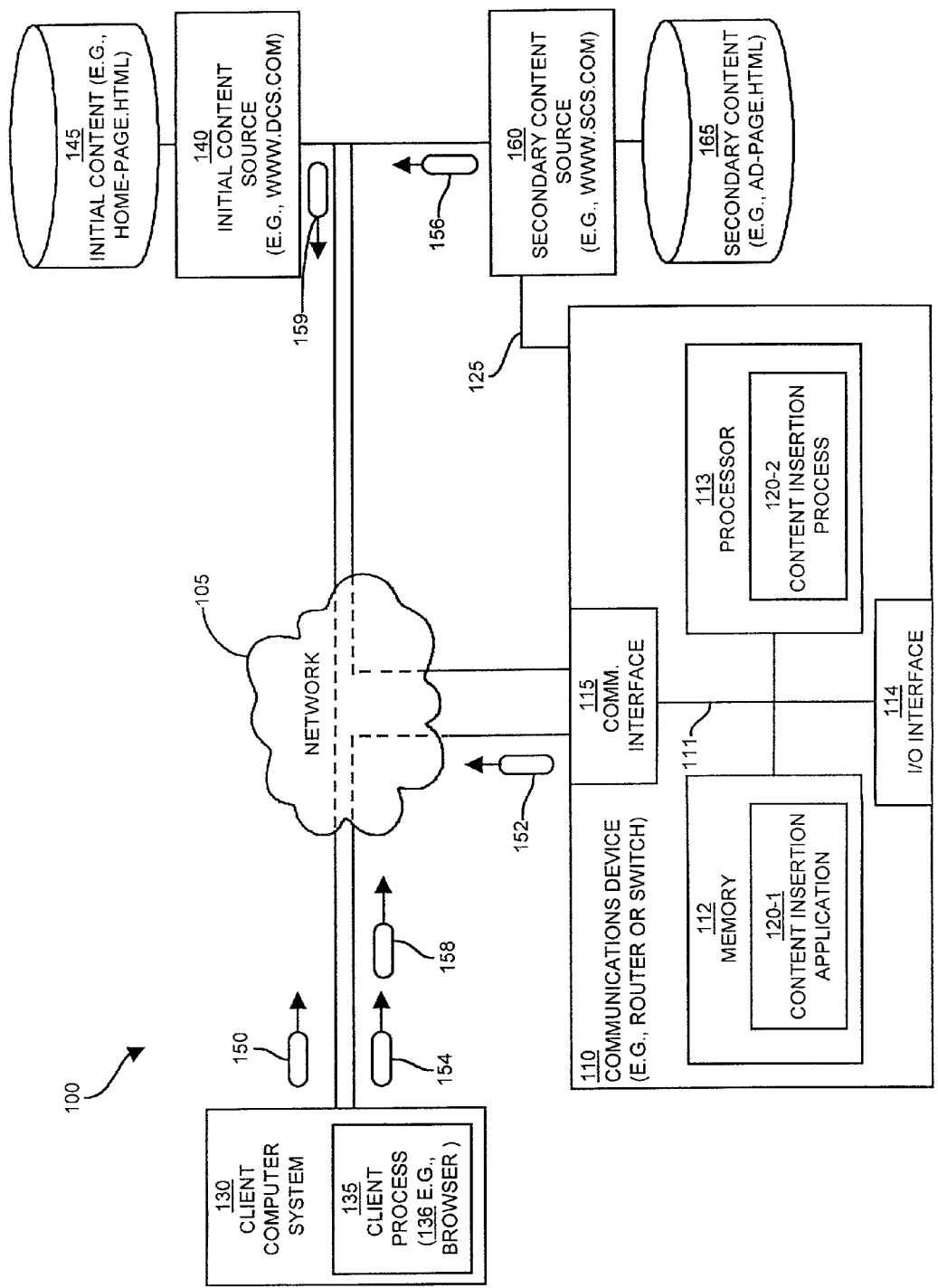
FIG. 1 shows a content insertion system with components that are suitable for use by the invention.

The invention is directed to mechanisms and techniques for intercepting an initial user request (e.g., a web page request) and redirecting the request to an alternate source in order to provide secondary content (e.g., advertisements) to a user in addition to the originally-requested content.

More particularly, a communications device (e.g., a switch or router) configured according to an example embodiment of the invention can intercept a request for content, at the entry point to the Internet (e.g., in an Internet Service Provider (ISP) facility) or other communications network. The communications device 110 may also read demographic or other information (e.g., a source or destination code or content information, etc.) provided along with the request or may be programmed with geographic location information, treating the information as a condition or request criteria that the communications device 110 can use to make a determination about what secondary content (e.g., an advertisement) should be provided to the requesting device. The use of this request criteria information allows for the targeted delivery of the secondary or alternative content based upon such factors as geographic locations, for example. The invention can also use other information such as global positioning coordinates, last mile link capacities, source and destination information or hypertext transfer protocol content information as conditions or request criteria as well.

After making a determination about what secondary content 165 to provide (e.g., what advertisements), the communications device 110 re-directs the initial request 150 to a secondary content provider 160 (e.g., an address of a secondary content provider 160 such as an advertising web server), for example, by use of a transmission control protocol code 302 redirection command. A code 302 redirection is a command sent back to a client process (e.g., an Internet browser 136), that causes the browser to initiate another request to the provided secondary address of the secondary content source 160.

In addition, the communications device appends the address of the initial content source 140 to the address of the secondary content source 160 so that the secondary content source 160 can use the address of the initial content source 140 to later redirect the client computer 135 to submit a request to the originally-requested source of content. Typically, after the secondary content source 160 has provided its content, the secondary content source 160 re-directs the requesting device (e.g., a client computer system 130) to the initial content source 140 to obtain the originally-requested content.

FIG. 1 shows a content insertion system 100 with components that are suitable for use by the invention. The content insertion system 100 includes a communications device 110 (e.g., router or switch), a client computer system 130 having a client process 135 (such as, for example, an Internet browser 136), a network 105, an initial content source 140 having initial content 145, and a secondary content source 160 having secondary content 165. The communications device 110 and client computer system 130 may be any type of computerized device or system such as a personal computer, workstation, server, networked system, or lager mainframe system, etc. In some cases, the communications device 110 may be a router or switch, etc. The communications device 110 includes an interconnection mechanism 111 (e.g., a data bus and/or circuitry) which couples a communications interface 114 (e.g., modem or other network interface), a memory 112 (e.g., any computer readable medium such as a random access memory (RAM) and/or read only memory (ROM) or even disk or storage medium) having a content insertion application 120-1, a processor 113 (microprocessor or central processing unit) with a content insertion process 120-2. The communications interface 114 allows the communications device 110 to communicate with the client computer 130 and other components of the system via the network 105.

FIG. 1 shows a single client computer system 130 for ease of description of the invention. It is to be understood that there can be many client systems coupled via the network 105 which operate according to the embodiments of the invention. The network 105 may be any type of computer or communications network that provides a communications medium such as networking cables and data communications devices such as routers, switches and the like between the computer systems. The client computer 130 allows a user to operate a client process 135 such as an Internet browser 136 or other application that can display Internet content (e.g., web page) and provide a graphical user interface to aid in controlling the display of different contents.

The secondary content source 160 may be any type of computer or other digital device, server, etc. (e.g., such as a web server) capable of responding to requests, accessing and processing secondary content 165 (e.g., advertising) stored on any kind of storage facility such as a disk drive or other storage mechanism. The initial content source 140 (e.g., any of the many servers accessible via the Internet) and its associated storage device store initial content 145 and are similar in arrangement to the secondary content source 160 and storage device. Each is connected to a network 105 (e.g., the Internet). The secondary content source 160 and secondary content 165, may also be connected 125 to the communications device 110 so as to permit communications between the communications device 110 and the secondary content source 160 directly. In the alternative, the communications device 110 and the secondary content source 160 may communicate over the network 105. Such communications will allow coordination between the redirection actions taken by the communications device 110 and actions taken by the secondary content source 160 with respect to the secondary content 165 (e.g., advertising content) located on the secondary content source 160.

FIG. 1 also includes a series of messages transmitted over the network 105 between the system components, in particular, an initial request message 150, a redirection information message 152, a first redirection command 154, a second redirection information 156, a second redirection command 158, and an initial content message 159. The components and method of the system provide a way, as a result of an initial request 150, to provide alternative or secondary content 165 to a user, based on observed criteria. In particular, the communications device 110 can intercept the initial request 150 for initial content 145, and after extracting information from the initial request 150 itself, divert the request to an alternate or secondary content source 160 before delivering the originally-requested initial content 145. Accordingly, upon receipt of an initial request 150 from the client computer system 130, the communications device 110 extracts information from the initial request 150 and compares the extracted information to pre-established criteria in order to determine what secondary content 165 should be provided to the client computer system 130. The information used for this decision may be taken from packet headers, or other transmission data, or from the actual content of the initial request or from information pre-programmed into the computerized device 110.

After the communications device 110 makes a determination about what secondary content 165 to provide to the client computer system 130, the communications device 110 will return a redirection information message 152 back to the client computer system 130 directing the client computer system 130 to initiate a first redirection command 154 to an alternate or secondary address of the secondary content source 160 that has the alternate or secondary content 165.

One method for re-directing the client computer 130 is to send an HTTP redirection code 302 along with the URL (Universal Resource Locator) of the secondary content 165. The redirection code causes the client computer system 130 to execute a first redirection command 154 for content to the secondary content source 160. According to one embodiment of the invention, the redirection information message 152 also includes the address of the originally-requested address and content filename. In particular, the universal resource locator (URL) address provided as part of the redirection information 152 is made up of the address for the secondary content source 160 and content name, followed by a question mark which is used as a delimiter, then followed by the address and content name of the originally-requested content appended afterward, for example, http://www.scs.com/ad-page?www.ics.com/home-page. By executing the first redirection command 154 using this address, the client computer system 130 requests secondary content 165 from the secondary content source 160.

Once the secondary content 165 has been obtained, the secondary content source 160 uses the address of the originally-requested initial content 145, e.g., www.ics.com/home-page which the communications device 110 provided to it as part of the initial redirection information message 152, to generate secondary redirection information 156. The secondary content source 160 then sends the information 156 to the client computer system 130. The secondary content source 160 can then send an HTTP redirection code 302 command to the client computer 130 that, in turn, causes the client computer 130 to initiate a second redirection command 158, this time, to obtain the initially requested initial content 145 from the initial content source 140.

In presenting the accessed content, it is useful to configure the secondary content 165 in such a manner that the client process browser 135 can display it without disruption of the display of initial content 145. Secondary content 165 may be displayed on the client computer 130 in any of a variety of configurations. For example, one alternative is to configure content in such a manner that the client computer system 130 displays the secondary content 165 first by itself, after which, the client computer system 130 displays the initially-requested initial content 145. Another alternative is for the client computer system 130 to display the secondary content 165 as a pop-up window with the initially requested initial content 145 in the background. A third alternative is for the client computer system 130 to display the secondary content 165 on a particular portion of the client computer system 130 screen with the initially-requested initial content 145 taking up other parts of the screen. Various other options for configuring the display of initial and secondary content 145, 165 that are typically known by individuals skilled in the art are also considered to be within the scope of the invention.

The steps to undertake coordination between the display of initial and secondary content 145, 165 may be prearranged and the commands and data necessary for such coordination may be stored on the communications device 110 or the secondary content source 160 or both. If necessary, information may be exchanged between the devices in any manner suitable, for example, by means of a data link 125 between the two devices and/or over the network 105. Further details of the invention will now be provided with reference to FIG. 2.

Figure 2:
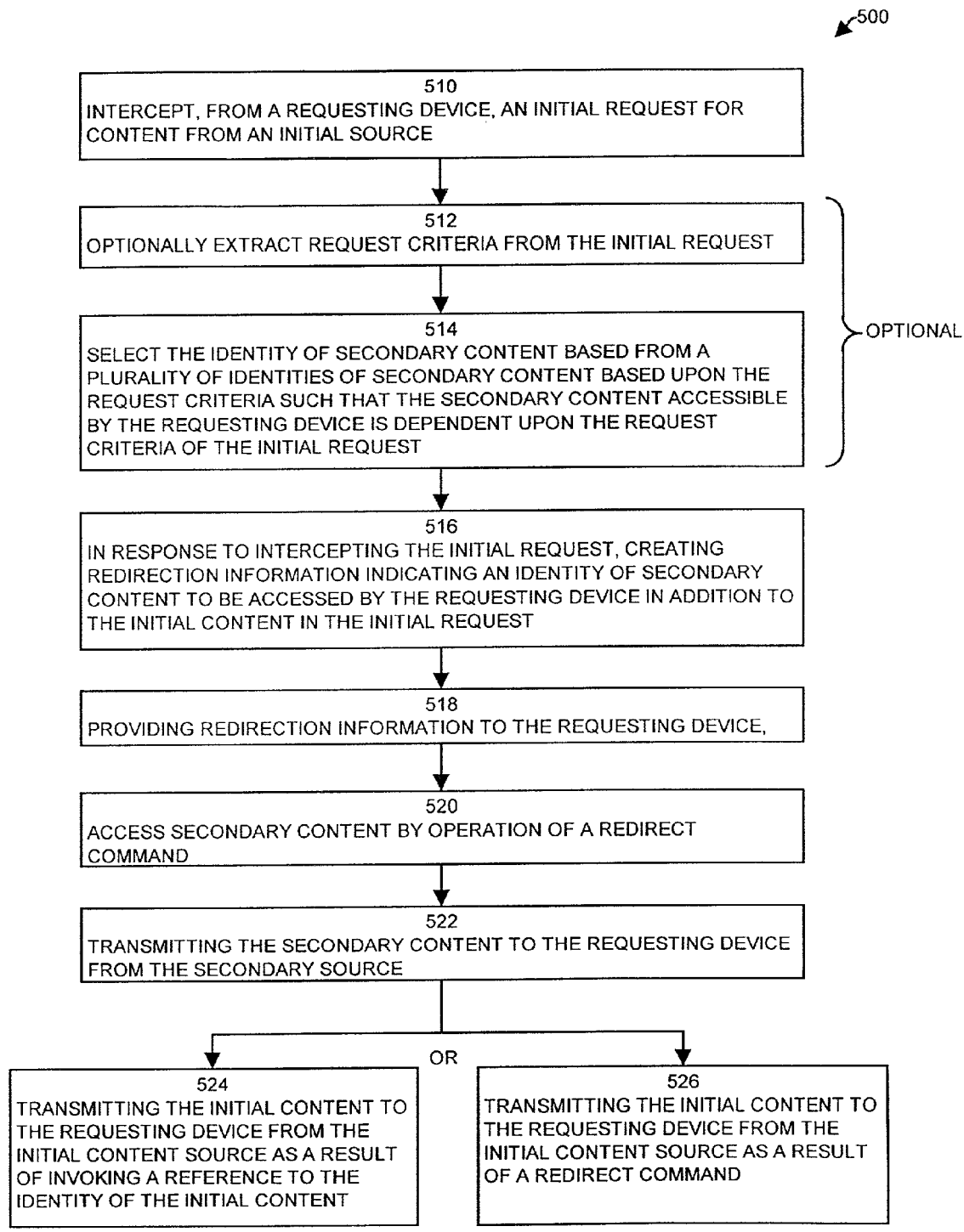
FIG. 2 is a flow chart of a procedure which is performed by a content insertion process according to one embodiment of the invention.

FIG. 2 is a flow chart of a procedure which is performed by the content insertion process 120-2 according to one embodiment of the invention.

In step 510 the content insertion process 120-2 which operates on the communications device 110, intercepts, from a requesting device (e.g., a client computer system 130) an initial request 150 for content (such as a request for any web page) from an initial source 140.

For example, a user may request a web page from his home computer. At the ISP of the user, a content insertion process 120-2 operating on a communications device 130 intercepts the user's initial request 150. Other locations such as airports, universities, apartment buildings, office buildings, etc. are also feasible sites for installation of the communications device 110 capable of intercepting initial requests for content 150.

In step 512, the content insertion process 120-2 optionally extracts a request criteria from the initial request 150. The content insertion process 120-2 can extract a variety of types of information to serve as the request criteria from an initial request 150. For example, the request criteria could be information extracted from the protocol header of the request, such as the source IP address information, taken from the IP header. Other header information could also be extracted. The communications device 110 can also extract content information from the request, for example, such as a domain name taken from the URL (universal resource locator).

In step 514, an optional step related to step 512, the content insertion process 120-2 selects the identity of the secondary content 165 (the secondary content that the initial request will be re-directed to) based on a plurality of identities of secondary content 165 that is based upon the request criteria such that the secondary content 165 that is accessible by the requesting device 130 is dependent upon the request criteria of the initial request 150. The request criteria (any of the information taken from the initial request 150 headers or content) can be used as a basis for the content insertion process 120-2 to select appropriate secondary content 165 (e.g., such as advertising) in a more targeted fashion for insertion.

In step 516, in response to intercepting the initial request 150, the content insertion process 120-2 creates redirection information 152 indicating an identity of secondary content 165 to be accessed by the requesting device 130 in addition to the initial content 145 in the initial request 150.

For example, if the initial request 150 is for http://www.dcs.com/home-page.htm, the redirection information provides an address of a secondary location containing secondary content 165, for example, the address www.scs.com/ad-page. The actual redirection information is made up of the combination of both the address of the content originally sought and the address of the secondary content 165 to be inserted, as follows: http://www.scs.com/ad-page?www.dcs.com/home-page.htm (See 152).

In an alternative embodiment of the invention, if the optional steps 512 and 514 are not performed, then, in step 516, the communications device 110 can use preprogrammed request criteria to make a selection of secondary content to be included in the redirection information 152. By way of example, the communications device 110 may be configured with request criteria such as a zip code of the town or geographic location in which the communications device 110 is configured to operate. As a specific example, suppose the communications device 110 is a switch or router that operates and resides within an ISP facility to which the client computer system 130 directly connects via a local dial-in telephone call or other short-distance connection (e.g., an xDSL line). Since the communications device 110 provides the initial connection to the network 105, which may be to the Internet, it may be thus assumed that the communications device 110 is in relative close geographic proximity to the client computer system 130. As such, if, during installation of the communications device 110, the communications device 110 is programmed or pre-configured with request criteria such as a zip code or other location information, this request criteria generally also identifies the approximate geographic location of the client computer system 130 that provides the initial request 150 for the initial content 145, due to its close proximity to the communications device 110.

As a result, in step 516, when the communications device 110 intercepts the initial request 150 and creates redirection information indicating an identity of secondary content 165 to be accessed by the requesting device (i.e., by the client computer system 130), the choice of secondary content 165 may be made based upon the request criteria which in this example is the zip code in which the communications device 110 operates.

According to this example embodiment of the invention then, the communications device 110 may choose to include a reference to secondary content within the redirection information 152 that specifies an advertisement or other content related to a local commercial business enterprise that is in relatively close geographic proximity to the request criteria such as the zip code used in this example. This results in the ability of embodiments of the invention to provide targeted content to the client computer system 130 to obtain request criteria from either the initial request 150 or from within the communication device 110 (e.g., such as pre-programmed location information) thus allowing the client computer system 130 to receive relevant targeted content which the user of that system can benefit from.

In step 518, the content insertion process 120-2 provides the redirection information 152 to the requesting device 130. This is the same address information as created in step 516.

In step 520, the content insertion process 120-2 accesses secondary content 165 by operation of a redirection command 154. One method of causing the client process 135 to access the secondary content 165 is the generation of a code 302 redirection. A code 302 redirection is instigated by the communications device 110 by sending the code 302 together with the address of the secondary content information 152 to the browser 136. In response, the browser 136 can access secondary content 165 located at the secondary content address, that was provided.

In step 522, the secondary content source 160 transmits the secondary content 165 to the requesting device (e.g., client computer system 130). At this point, there may already have been coordination with respect to the initial content 145 to be identified or requested by the content insertion process 120-2 of the communications device 110 and the secondary content 160 that would be supplied by the secondary content source 160. For example, a user may request advertising of a certain nature, for example, advertising about used cars from the initial content source 140. The request is intercepted by the communications device 110. The secondary content source 165, however, may contain advertisements for different used car lots in different geographic areas. In order for the communications device 110 to provide the proper address to access the secondary content source 160 for a used car lot in the appropriate geographic area, addresses of the secondary content 165 must have been loaded into the communications device 110 in coordination with the data stored in the secondary content source 160 for the used car lots in different geographic areas so that the content insertion process 120-2 is able to provide the right address to direct the initial request 150 to the proper address of the secondary content source 160. There may also have been coordination with respect to the layout and/or presentation of initial and secondary content 145, 165 as well. For example, the proper addresses of the secondary content source 165 are loaded onto the communications device 110 as appear in banner advertisements overlying the initial content 145 displayed on the user's display, in coordination with the actual secondary content 165 loaded onto the secondary content source 165.

As discussed earlier, a wide variety of presentation formats are possible. As described in steps 512 and 514, the content insertion process 120-2 may use request criteria obtained from the initial request 512 (e.g., taken from the packet headers, from the content request, etc.) to decide from among multiple alternatives of secondary content 165 that the client process 135 (e.g., browser 136) will access or the communications device 110 may be pre-programmed with this request criteria.

In step 524, the browser 136 causes the initial content source 140 to transmit the initial content 145 to the requesting device (e.g., the client computer system 130) from the initial content source 145 as a result of invoking a reference to the identity 150 of the initial content 145. In other words, in this example, at some point during or after the secondary content 165 has been transmitted to the client computer 130, the browser 136 is directed to the initial content 145.

One method for obtaining and displaying the initial content 145 is to provide a user-enacted option to initiate a request for the initial content 145. For example, a secondary content screen containing the secondary content 165, transmitted to the client computer system 130 for display, could provide a user with an option to click on the screen, thereby initiating the second request for the initial content 145, after the user has finished viewing the secondary content 165. Alternatively, the secondary content display might be configured with a user-selectable option providing the user with an option whether to access the initial content 145 at all.

In step 526, the browser 136 causes the initial content source 140 to transmit the initial content 145 to the requesting device (e.g., the client computer system 130) as a result of a redirection command being provided with the second redirection information 158. For example, after the secondary content 165 has been displayed on the client computer system 130, the secondary content source 165 sends a code 302 redirection command along with the address of the initial content 159.

Another example of an implementation of an embodiment of the invention will further assist in providing a better understanding of the invention. In the example, a communications device 110 is installed at an Internet service provider (ISP) associated with a local college campus. Whenever users of the Internet service access the Internet, their requests for web content are first routed through the communications device 110 before being transmitted within the Internet. Since the IP addresses of the users located on the college campus are known to the ISP, upon receiving requests for web content from users located on-campus, the communications device 110 is able to identify on-campus users by identifying the IP addresses in IP packet headers transporting the on-campus user's initial requests 150.

After identifying on-campus users, the communications device 110 can insert advertising material 165 into the web content 145 delivered to on-campus users in several ways. In one case, the ISP, provides banner advertisements 165 that are transmitted to users and which display on users' display screens just prior to and up to 10 seconds after the originally-requested content 145 is displayed.

After the initial request for content 150 is transmitted to the communications device 110 (at the ISP), the communications device 110 identifies whether the user is an on-campus user by reading IP addresses as request criteria. If so, the communications device 110 creates redirection information 152 consisting of the URL (universal resource locator) address of a banner advertisement which is stored at a secondary content source 160 located elsewhere. The communications device 110 transmits the redirection information containing the address of the location of the banner ad 165 and the originally-requested content address appended to the end, along with a code 302 redirection which causes the on-campus user's browser 136 to perform a request for the banner ad located on the secondary content source 160.

After receiving the request, the secondary content source 160 first transmits the banner advertisement 165 to the user, then creates second redirection information 156 containing the URL address of the original content source 140, and finally, transmits the second redirection information and a code 302 redirection code to the user's browser 136. The 302 redirection code causes the user's browser 136 to request the originally-requested web content from the initial content source 145. Further details of the invention will now be provided with respect to FIG. 3.

Figure 3:
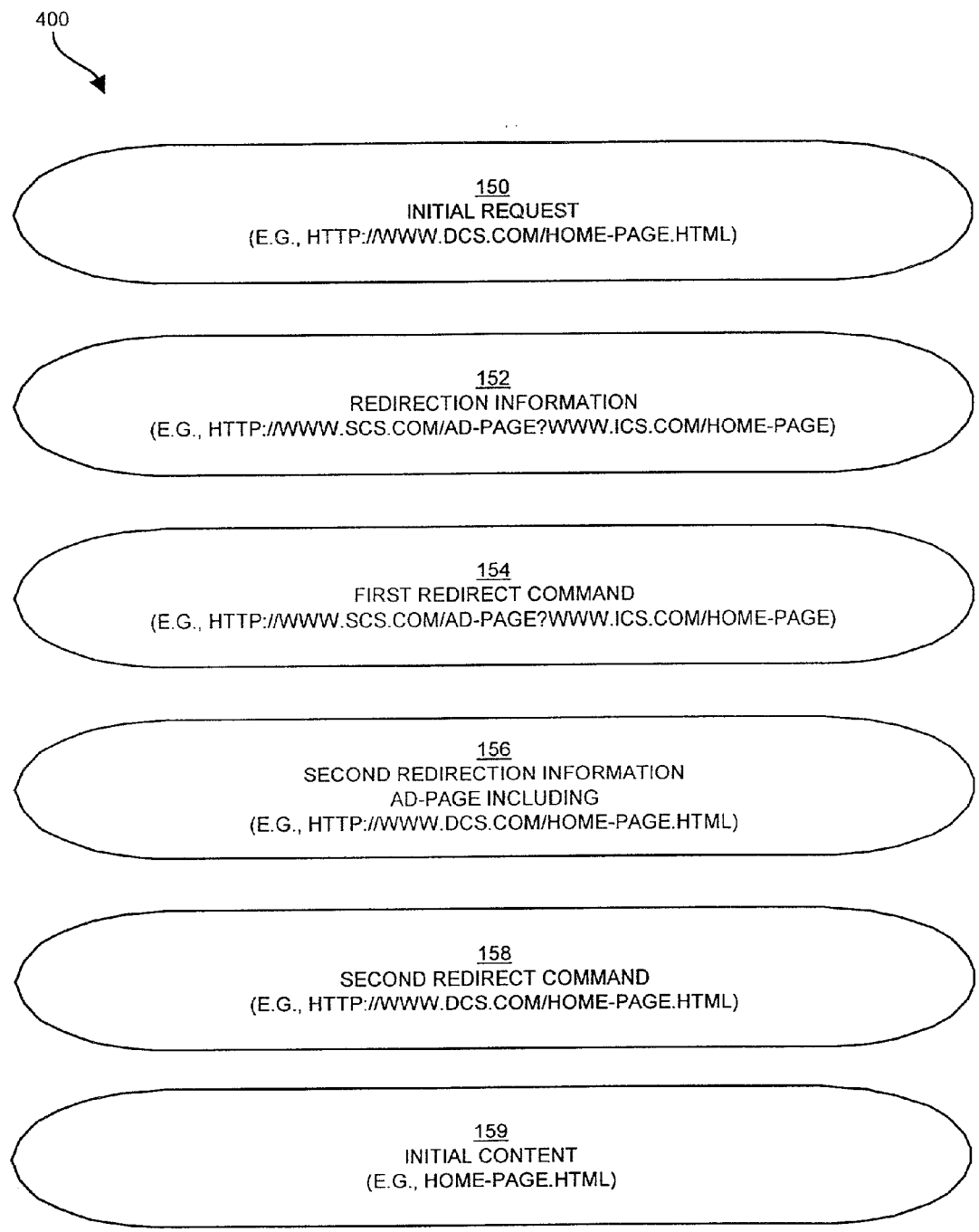
FIG. 3 is a depiction of the messages communicated between the components of a content insertion system according to one embodiment of the invention.

FIG. 3 is a depiction of the messages communicated between the client computer system 130, client process 135 (e.g., browser 136), the communications device 110 operating the content insertion process 120-2, initial content source 140 (and in turn, the initial content 145) and secondary content source 160 (and in turn, the secondary content 165). The messages include the initial request 150, the redirection information 152, the first redirection command 154, the second redirection information 156, the second redirection command 158 and the initial content 159 messages. The use of these messages is described in conjunction with FIGS. 1,2,4,5. Further details of the invention will now be provided with respect to FIG. 4.

In the embodiment of the invention as described above, the communication device 110, after intercepting an initial request 150 from the client computer system 130, causes the client computer system 130 to execute a redirection, thereby relinquishing control to another device (e.g., the secondary content source 160). However, an alternative embodiment will be depicted in FIG. 4 using a method that allows the communications device 110 to maintain control over how the client process 135 is redirected to the initial content source 140 address instead of relinquishing control to the secondary content source 160. By not relinquishing control, the communications device 110 can mask or otherwise hide the identify of the client computer system 130 from the perspective of the secondary content source 160. The system 300 of FIG. 4 includes the same components as described in FIG. 1, except with respect to messages transmitted between different components of the embodiment of the invention.

Figure 4:
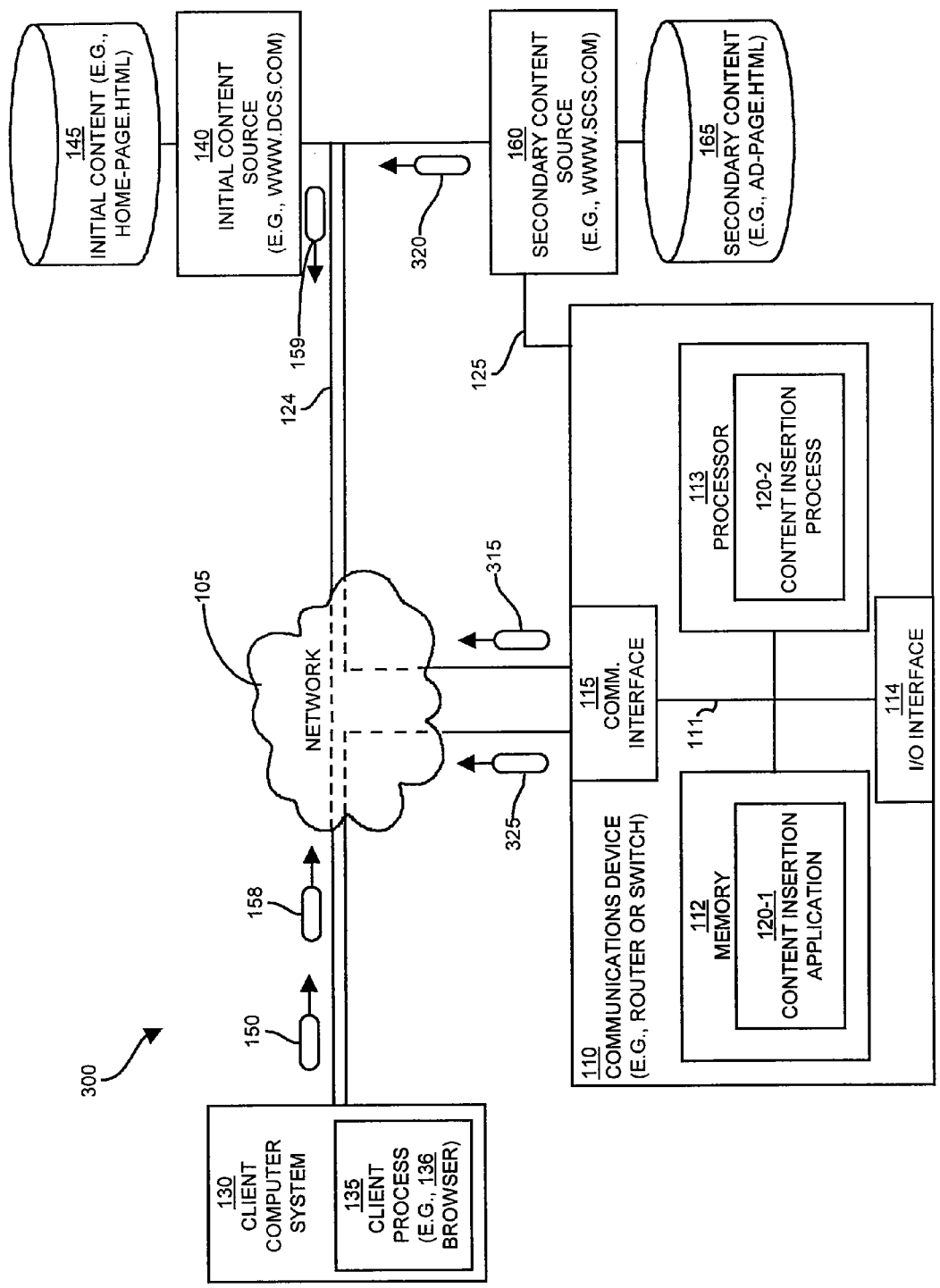
FIG. 4 is depiction of an embodiment of the invention which allows a communications device to maintain control over access to initial content.

FIG. 4 includes the following messages: the initial request 150, a request for secondary content 315, secondary content (provided to the communications device 110) 320, secondary content (provided to client process) 325, the second redirection command 158, and the initial content 159. One difference between the previously described embodiment depicted in FIG. 1 and this embodiment is that the content insertion application 120-1 of the communications device 110 is programmed to access secondary content itself and forward it to the requesting device (e.g., client computer system 130) rather than to redirect the requesting device (e.g., client computer system 130). In other words, the communications device 110, accesses secondary content directly. The communications paths for this embodiment are the network 105 paths described earlier for communications with other devices or path 125. Further details of the procedure performed by the content insertion system depicted in FIG. 4 will now be provided with respect to FIG. 5.

Figure 5:
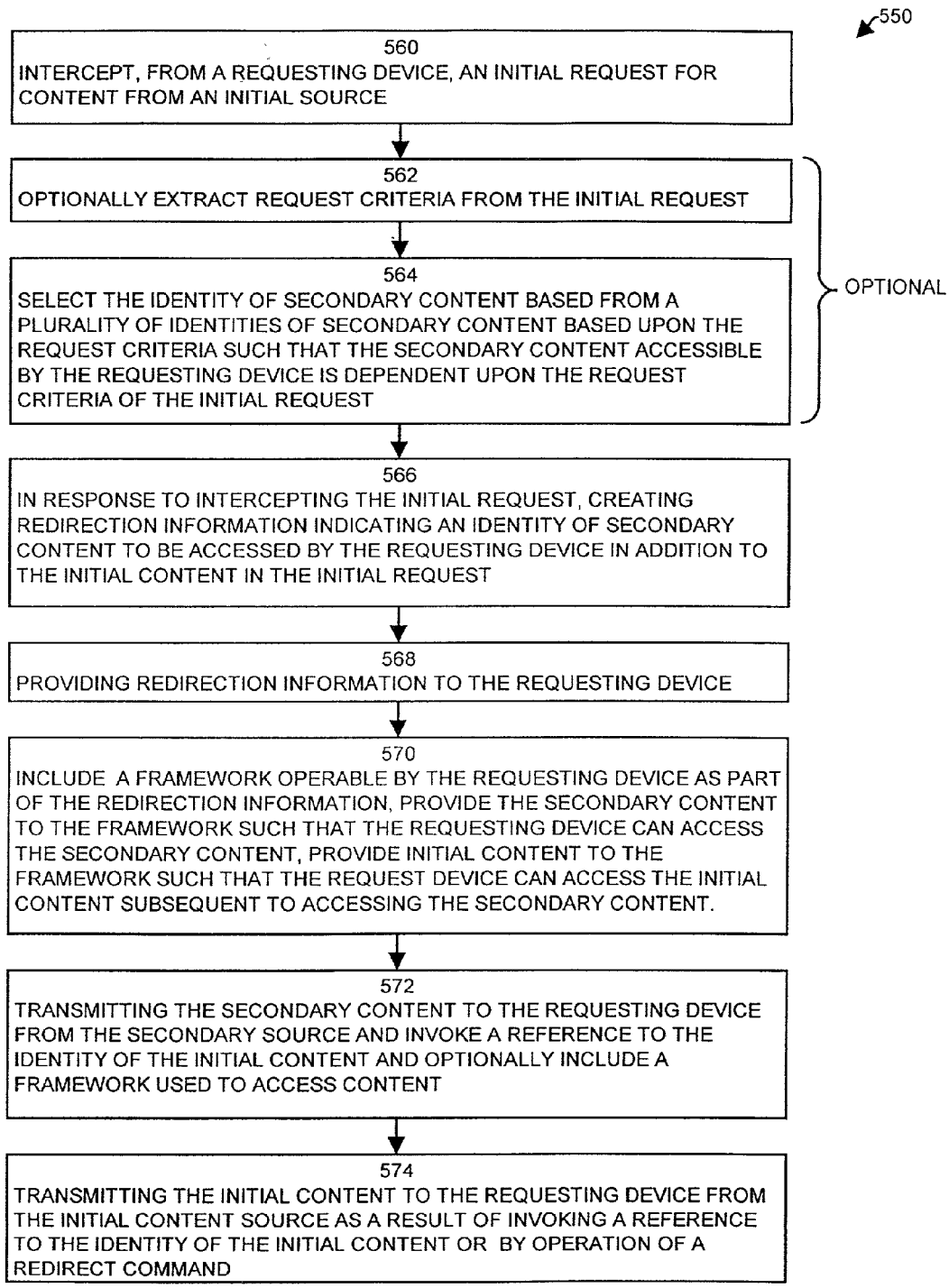
FIG. 5 is a flow chart of a procedure performed by the communications device in the embodiment of the invention depicted in FIG. 4. in which the communications device maintains control of the requesting device's access to content.

FIG. 5 is a flow chart of a procedure 550 performed by the content insertion system 300 in which the communications device 110, itself, maintains control of access of the secondary content 165. In FIG. 5, steps 560 through 568, which are the steps from intercepting an initial request up through providing redirection information to the requesting device, are performed in the same manner as steps 510 through 518 of FIG. 2. However, in the next steps, starting with step 570, the steps of procedure 550 show an alternative embodiment.

In step 570, the redirection information sent to the client computer system 130 by the content insertion process 120-2 includes a framework operable by the requesting device 130 (e.g., by the browser 136) as part of the redirection information 325. After transmitting the framework and redirection information 325, the content insertion process 120-2 requests secondary content 315 from the secondary content source 160. Upon receiving the secondary content 320, the content insertion process 120-2 provides secondary content combined with the framework such that the requesting device (e.g., the client process 135) can access the secondary content and such that the requesting device can access the initial content subsequent to accessing the secondary content.

There are a variety of options available for providing a framework to the client process 135 (e.g., browser 136) that can be used to control the user experience. One example is to provide a framework with an embedded mega-refresh command inserted into the HTML (hypertext mark-up language) code of the web page framework. Other methods can also be used to provide a framework and use the framework in conjunction with accessing content, as may typically be known by individuals experienced in the art of providing such tools. As discussed earlier, use of this approach results in the content insertion process 120-2 maintaining control over access to the initial content 145, rather than control being exerted by the secondary content source 160, as occurs according to the embodiment of the invention described in FIGS. 1 and 2.

In step 572, the content insertion process 120-2 transmits the secondary content 165 to the requesting device (e.g., client process 130) from the secondary content source 160 and invokes a reference to the identity of the initial content 145 and optionally includes a framework used to access content. In step 574, the content insertion process 120-2 transmits the initial content 145 to the requesting device (e.g., client computer system 130) from the initial content source 130 as a result of invoking a reference to the identity of the initial content or by operation of a redirection command 158. In this case the content insertion process 120-2 can transmit redirection information 156 with the address of the initial content 145 along with a redirection code 302 causing the client process 135 to access the initial content 145. Other methods of generating an initial request 150 for content are also possible. Further details of the invention will now be provided with reference to FIG. 6.

Figure 6:
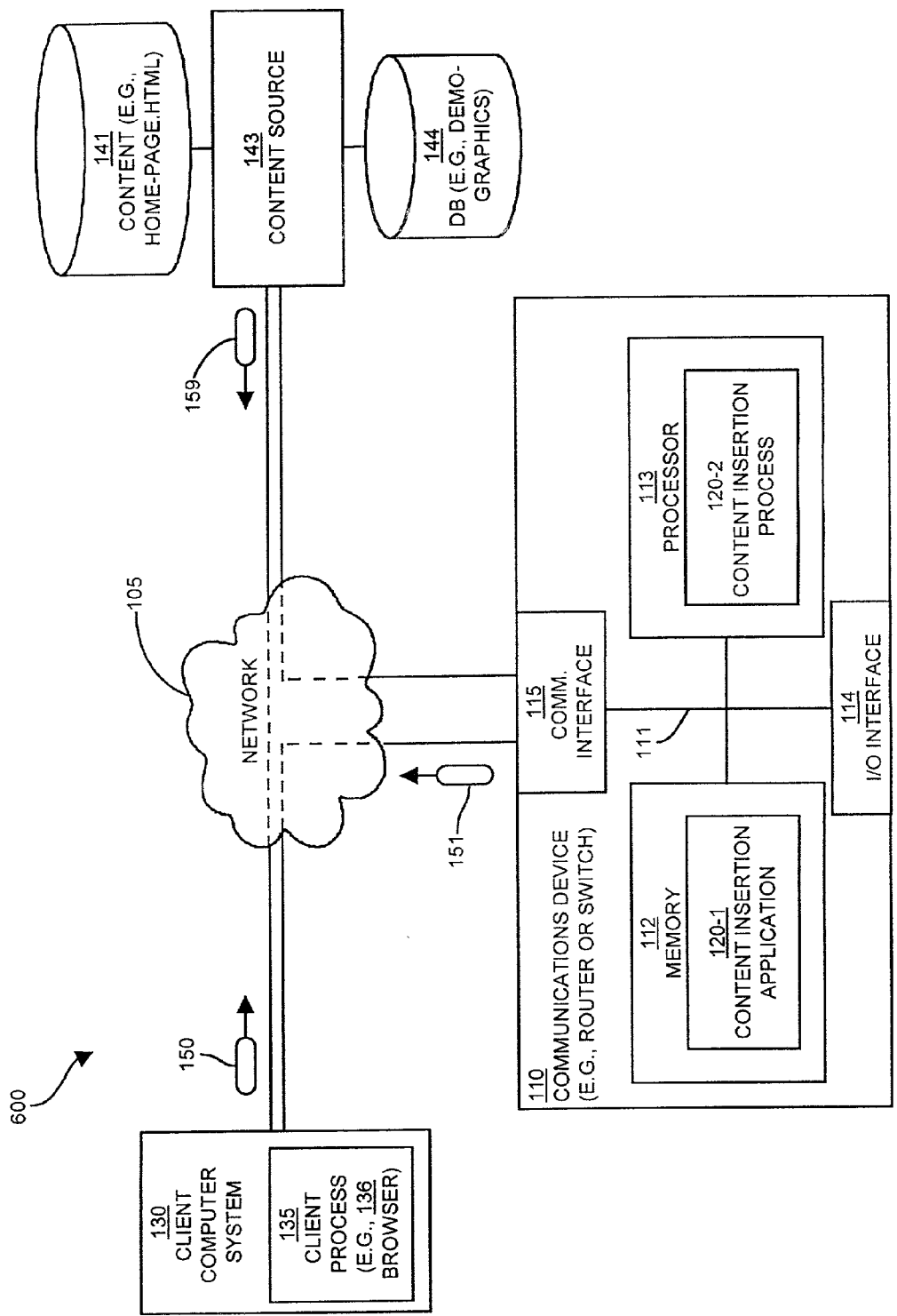
FIG. 6 is a depiction of an embodiment of the invention in which a content source provides a key that can access information used in the selection of content.

FIG. 6 shows an arrangement which is similar to FIG. 1 with respect to the client computer system 130 and network 105. The communications device 110 uses the same components as described in FIG. 1. However, unlike the embodiment of the invention as described in connection with FIG. 1, the communications device 110 of FIG. 6 is capable of performing different operations than the communications device 110 of FIG. 1. In particular, the communications device 110, after intercepting a request for content (in a similar fashion as described for the embodiment of the invention of FIG. 1), creates a key that can be used to reference information related to the request. Both the key and the related information are forwarded by the communications device 110 to the content source 143. In an alternative configuration, however, the related information may be forwarded to a different location.

FIG. 6 shows a content source 143 connected to a device containing content 141 and a storage device 144, capable of storing the key and related information 151 (i.e., related to the initial request 150) created by the communications device 110, as described earlier. The content source 143, uses the key to access the related information 151 (sent to it by the communications device 110) which is stored in storage device 144. In turn, the content source 143 uses the related information 151 to determine what content, located on the content storage device 141 to return to the communications device 110, or to the client computer system 130. In an alternative configuration, another device, such as a storage device connected to the communications device 110 or an initial or secondary content source 140, 160 such as the one describe for the embodiment of the invention of FIG. 1 which is accessible by the content source 143 may hold the related information 151.

FIG. 6 also shows messages, including the initial content request 150, the key and related information 151 generated by the communications device 110 and the initial content 159. The communications device 110 may transmit the key and related information 151 together to the content source 143. The communications device may alternatively transmit the key and related information 151 separately. The communications device may also transmit the key to the content source 143 and transmit the related information to another location, as described earlier. Further details of the invention will now be provided with reference to FIG. 7.

Figure 7:
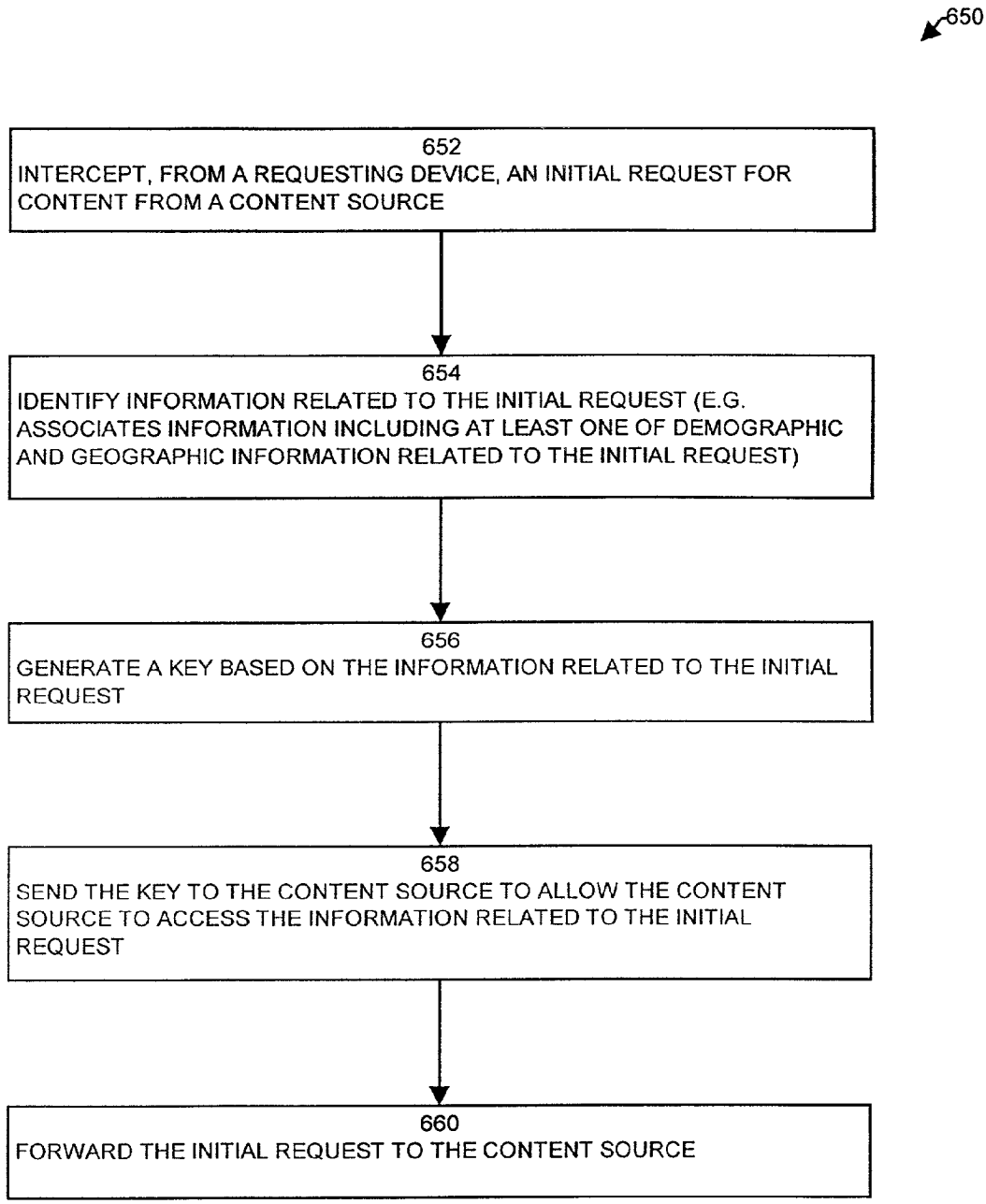
FIG. 7 is a flow chart of a procedure performed by the communications device in the embodiment of the invention depicted in FIG. 6.

FIG. 7 is a flow chart of a procedure 650 which is performed by the communications device 110 according to one embodiment of the invention as shown in FIG. 6. In step 652, the communications device 110 itercepts an initial request 150 for content sent from a requesting device (e.g., a client computer system 130) to a content source 143. For example, a user may request a web page of advertisements using his home computer. Then, after the client computer system 130 transmits the initial request 150, the initial request 150 is intercepted by the communications device 110, located at the ISP of the computer user.

In step 654, the communications device 110 identifies information related to the initial request 150. For example, the communications device 110 may use the IP address of the user (e.g., taken from a packet header) to identify the specific user. The communications device 110 may also identify a variety of other information as well, such as, for example, the intended destination of the initial request 150 or at least one of demographic and geographic information related to the initial request 150.

In step 656 the communications device 110 generates a key 151 based on information related to the initial request 150. For example, the key is used as a reference to information related to the user's request 150. The key may simply reference the user's IP address. The key may also reference other information such as, for example, the user's name and address, the user's geographic location, or other demographic information and advertising related information, etc.

In step 658 the communications device 110 sends the key 151 to the content source 143 to allow the content source 143 to access the information related to the initial request 150 (e.g., the key associates information including at least one of demographic and geographic information to the initial request). For example, using the key created by the communications device 110 and transmitted to the content source 143 (and stored in the information store 141), the content source 143 is able to identify the geographic location of the user making the initial request 150. The content source can use this information to select from among different alternatives of content to provide, such as, for example, different advertisements tailored to different geographic locations. A great variety of selections based on related information, accessible using the key, is possible, as provided by the various embodiments of the invention.

In step 660, the communications device 110 forwards the initial request 150 to the content source 143. Upon receipt of the initial request 150, the content source 143 is able to either fill the initial request 150 directly or use the related information accessible by use of the generated key 151 to identify from among alternative contents that the content source may return to the user (e.g., the client computer 130) generating the initial request 150.

In addition to the embodiment depicted in FIG. 6, other configurations representing various different embodiments of the invention exist as well. For example, the key generated by communications device 110 used to access related information 151 may be used in conjunction with the redirection techniques and mechanisms as described earlier. Accordingly, the communications device 110 (or alternatively the secondary content source 160, as described earlier) may cause one or multiple alternative redirection commands to be executed by the user's computer 130, that will access different alternative contents based on the use of the key generated by the communications device 110 and the related information 151. The communications device 110, using keys and the related information 151, may cause the use of different redirection commands to be created to access different alternative contents, or it may be configured in such a fashion as to provide keys to the content source that the content source 143 can use for selecting and providing from among alternative contents when responding to a single redirection command.

In addition, the use of the key and related information 151 described in this embodiment of the invention may also be employed in conjunction with the techniques and mechanisms for providing content obtained from other sources but first directed to the communications device 110 before being redirected to the client computer system 130 (e.g., no direct access between the client computer 130 and other content sources). The embodiment of the invention described with reference to FIG. 6 may also be used in conjunction with different configurations of initial content and secondary content sources 140, 160, as described earlier. Also, related information accessible by the communications device 110 generated key 151 may also be located in any of a variety of different places accessible by the content source 143. Numerous different combinations and configurations of the various embodiments of the inventions as described herein are possible. Further details of the invention will now be provided with reference to FIG. 8.

Figure 8:
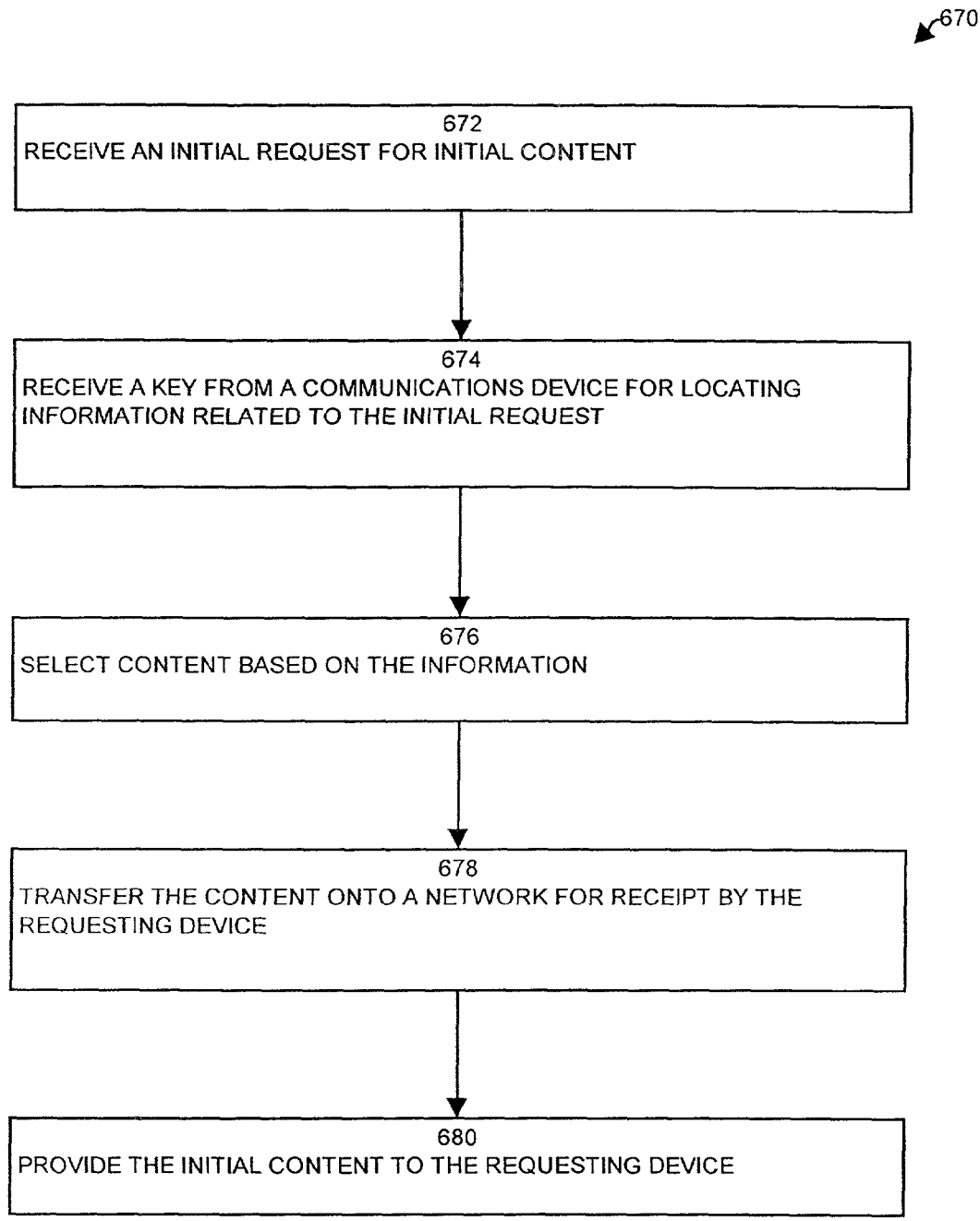
FIG. 8 is a flow chart of a procedure performed by the content source in an embodiment of the invention as depicted in FIG. 6.

FIG. 8 is a flow chart of a procedure which is performed by the content source 143 according to one embodiment of the invention 670, as shown in FIG. 6.

In step 672, the content source 110 receives an initial request 150 for initial content 159. For example, the content source 143 receives the initial request 150 generated and sent from a client computer 130, by the computer user, via the communications device 110.

In step 174, the content source 143 receives a key 151 from the communications device 110 for locating information related to the initial request 150. For example, the content source 143 receives a key 151 from the communications device 110 that the content source 143 can use to obtain geographic information associated with the initial request 150, such as, for example, the geographic location of the user making the initial request 150. In step 676, the content source 143 selects content based on the information accessible by using the key 151 provided by the communications device 110.

In step 678, the content source 143 transfers the content 159 onto the network for receipt by the requesting device 130. As described earlier, the content may be transmitted via the communications device 110 or other alternative transmission paths described in connection with the various embodiments of the invention.

In step 680, the content source 143 provides initial content 159 (e.g., an advertisement referencing an advertiser located in a particular geographic area) to the requesting device 130.

The features of the invention may be employed in data communications devices and other computerized devices such as those manufactured by Cisco Systems, Inc. of San Jose, Calif.

As described above, the invention is directed to techniques and mechanisms for transparently providing a customized presentation of advertising or other secondary content 165 to users in which a variety of request criteria (e.g., location, user identification, content information, etc.), extracted from the initial request, can be used as the basis for choosing different secondary content 165 to present to users.

While this invention has been particularly shown and described with references to preferred embodiments thereof, it will be understood by those skilled in the art that various changes in form and details may be made therein without departing from the spirit and scope of the invention as defined by the appended claims.

For example, the network 105 may be a typical data communications network or any other facility for electronic transmission. A typical data communications network includes many hosts interconnected by various communications devices.

Data communications devices 110 can be routers, bridges, switches, access servers, gateways, hubs, concentrators, proxy servers, repeaters and so forth which exchange data over an interconnection of data links. These may be physical connections or may also be provided using wireless communication mechanisms. On the low end they may also be as simple as wire connections between two devices. The network 105 allows data to propagate between various applications that execute on the hosts.

Various physical or hardware data communications connection mechanisms allow devices to interconnect with the network 105. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices. For example, certain devices or hosts may have high speed network interfaces which provide connections to the network at high data rate such as fractional-T1, T1, E1 or higher, while other devices or hosts may use an inexpensive modem that provides a maximum data transfer rate of 56.6 kilobits per second (Kbps), more or less, to and from the network.

It should also be noted that the examples provided herein describe standard web (HTTP) requests. However, since HTTP is also used as the control protocol for many streaming protocols (e.g., Real, RTSP, etc.) other types of content can also work with the techniques and mechanisms described here.

What is claimed is:

1. A method performed in an intercepting communications device, the method comprising:
   maintaining, in the intercepting communications device, access to a plurality of secondary content addresses, where a secondary content address identifies secondary content located at a secondary content source;
   intercepting an initial request for initial content made by a requesting device before the initial request arrives at an intended destination, the intended destination being an initial content source;
   extracting at least one request criteria from the intercepted initial request;
   creating redirection information by processing the at least one request criteria to determine an identity of secondary content to be retrieved by the requesting device, wherein the redirection information includes a first redirection code and a second redirection code; and
   transmitting the redirection information to the requesting device without transmitting the secondary content from the intercepting communications device to the requesting device; wherein receipt of the redirection information by the requesting device controls the requesting device to issue a first request for the secondary content based on the first redirection code and wherein receipt of a command from a source of the secondary content by the requesting device controls the requesting device to issue a second request for the initial content based on the second redirection code, wherein the receipt of the command occurs subsequent to issuing the first request.

2. The method of claim 1, where processing the at least one request criteria to determine an identity of secondary content comprises:
   extracting the at least one request criteria from at least one protocol header of the intercepted initial request; and
   matching the at least one extracted request criteria to at least one of the plurality of secondary content addresses.

3. The method of claim 2, where matching the at least one extracted request criteria to at least one of the plurality of secondary content addresses comprises:
   determining desirable secondary content by identifying at least one of the plurality of secondary content addresses that maps to content related to the at least one extracted request criteria; and
   capturing an address from at least one of the plurality of secondary content addresses that maps to content related to the at least one extracted request criteria.

4. The method of claim 3, where identifying at least one of the plurality of secondary content addresses that maps to content related to the at least one extracted request criteria comprises:
   identifying content related to at least one source indication from the at least one extracted request criteria;
   identifying content that has at least one geographic indication related to at least one geographic location of the communications device;
   identifying content that has at least one geographic indication related to at least one geographic indication from the at least one extracted request criteria; and
   identifying content related to at least one initial content indication from the at least one extracted request criteria.

5. The method of claim 3, where capturing at least one address from the plurality of secondary content addresses that maps to content related to the at least one extracted request criteria comprises:
   capturing at least one Internet address for at least one advertisement that is related to the at least one extracted request criteria, the at least one advertisement being programmed to be displayed with respect to a display of the initial content.

6. The method of claim 1, where creating redirection information comprises:
   concatenating together the first redirection code and the second redirection code; and
   separating the first redirection code and the second redirection code by a delimiter.

7. The method of claim 6, comprising:
   including an address of the secondary content source in the first redirection code; and
   including an address of the at least one initial content source in the second redirection code.

8. The method of claim 6, where the delimiter separating the first redirection code and the second redirection code indicates to the requesting device an existence of a secondary content condition.

9. The method of claim 1, where processing at least one request criteria extracted from the intercepted initial request to determine an identity of secondary content to be retrieved by the requesting device comprises:
   determining the identity of the secondary content relative to at least one of a geographic indication, a source indication, and a content indication in the at least one request criteria extracted from the intercepted initial request.

10. The method of claim 1, where intercepting the initial request includes intercepting the initial request at an entry point to the Internet.

11. A non-transitory computer-readable medium storing computer-executable instructions that when executed by a computer control the computer to perform a method, the method comprising:

maintaining, in the computer, access to a plurality of secondary content addresses, where a secondary content address identifies secondary content located at a secondary content source;

intercepting an initial request for initial content made by a requesting device before the initial request arrives at an intended destination, the intended destination being an initial content source;

extracting at least one request criteria from the intercepted initial request; creating redirection information by processing the at least one request criteria to determine an identity of secondary content to be retrieved by the requesting device, wherein the redirection information includes a first redirection code and a second redirection code; and transmitting the redirection information and a command to the requesting device without transmitting the secondary content from the computer to the requesting device; wherein receipt of the redirection information by the requesting device controls the requesting device to issue a first request for the secondary content based on the first redirection code and wherein receipt of a command from a source of the secondary content by the requesting device controls the requesting device to issue a second request for the initial content based on the second redirection code, wherein the receipt of the command occurs subsequent to issuing the first request.

12. A method performed in an intercepting communications device, the method comprising:

maintaining, in the intercepting communications device, access to a plurality of secondary content addresses, where a secondary content address identifies secondary content located at a secondary content source;

intercepting an initial request for initial content made by a requesting device before the initial request arrives at an intended destination, the intended destination being an initial content source;

extracting at least one request criteria from the intercepted initial request; creating redirection information by processing the at least one request criteria to determine an identity of secondary content to be retrieved by the requesting device, where creating redirection information comprises:

concatenating together a first redirection code and at least one second redirection code, where the first redirection code instructs the requesting device to issue a first request for the secondary content, and where receipt of a command from a source of the secondary content by the requesting device controls the requesting device to issue a second request for the initial content based on the second redirection code, wherein the receipt of the command occurs subsequent to issuing the first request; and separating the first redirection code and the second redirection code by a delimiter;

transmitting the redirection information to the requesting device without transmitting the secondary content from the intercepting communications device to the requesting device.

13. The method of claim 12, comprising:
including an address of the initial content source in the second redirection code; and
including an address of the at least one secondary content source in the initial redirection code.

14. The method of claim 12, where processing the at least one request criteria to determine an identity of secondary content comprises:

extracting the at least one request criteria from at least one protocol header of the intercepted initial request; and
matching the at least one extracted request criteria to at least one of the plurality of secondary content addresses.

15. The method of claim 14, where matching the at least one extracted request criteria to at least one of the plurality of secondary content addresses comprises:

determining desirable secondary content by identifying at least one of the plurality of secondary content addresses that maps to content related to the at least one extracted request criteria; and
capturing an address from at least one of the plurality of secondary content addresses that maps to content related to the at least one extracted request criteria.

* * * * *